(12) United States Patent
Viera et al.

(10) Patent No.: US 12,206,825 B1
(45) Date of Patent: *Jan. 21, 2025

(54) PROVIDING A COMMUNICATION HISTORY OF A MULTI-MODAL COMMUNICATION BASED ON AN AGGREGATION OF EVENTS

(71) Applicant: 8x8, Inc.

(72) Inventors: Julio Viera, Brooklyn, NY (US); Alan Sapede, Boston, MA (US); Clement Wehrung, Paris (FR); Jedidiah Brown, Brooklyn, NY (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,190

(22) Filed: Mar. 18, 2022

Related U.S. Application Data

(63) Continuation of application No. 16/383,456, filed on Apr. 12, 2019, now Pat. No. 11,283,934, which is a continuation of application No. 15/706,170, filed on Sep. 15, 2017, now Pat. No. 10,306,071.

(51) Int. Cl.
| | |
|---|---|
| *H04M 7/00* | (2006.01) |
| *H04M 1/253* | (2006.01) |
| *H04L 51/046* | (2022.01) |
| *H04L 51/216* | (2022.01) |
| *H04L 51/56* | (2022.01) |
| *H04L 65/403* | (2022.01) |

(52) U.S. Cl.
CPC ....... *H04M 7/0081* (2013.01); *H04M 1/2535* (2013.01); *H04L 51/046* (2013.01); *H04L 51/216* (2022.05); *H04L 51/56* (2022.05); *H04L 65/403* (2013.01); *H04M 7/0075* (2013.01)

(58) Field of Classification Search
CPC ............. H04M 1/0081; H04M 1/0075; H04M 1/2535; H04M 2203/551; H04M 2250/60; H04L 51/046; H04L 51/16; H04L 51/36; H04L 65/403
See application file for complete search history.

(56) References Cited

U.S. PATENT DOCUMENTS

| | | | | |
|---|---|---|---|---|
| 3,688,047 A | * | 8/1972 | Morris ................. | H04M 15/00 348/14.11 |
| 6,058,307 A | * | 5/2000 | Garner ............... | H04B 7/18567 455/12.1 |
| 6,249,570 B1 | * | 6/2001 | Glowny ................. | G11B 31/00 |
| 6,754,323 B1 | * | 6/2004 | Chang ................. | H04M 3/2218 379/205.01 |

(Continued)

*Primary Examiner* — Dung B Huynh
(74) *Attorney, Agent, or Firm* — Crawford Maunu PLLC

(57) ABSTRACT

Methods are provided for providing a unified communication history of a multi-modal communication. In one aspect, a method includes receiving a plurality of event logs related to the multi-modal communication. The multi-modal communication comprises a first communication modality and a second communication modality. The method includes aggregating the one or more events from the event logs as a plurality of aggregated events and resolving an identity of each user from among the plurality of users in the plurality of aggregated events. The method includes storing the aggregated events into a communication history of the multi-modal communication. Systems and machine-readable media are also provided.

20 Claims, 7 Drawing Sheets

(56) References Cited

U.S. PATENT DOCUMENTS

| | | | | |
|---|---|---|---|---|
| 8,819,243 | B1* | 8/2014 | Cope | H04W 4/00 709/227 |
| 8,838,488 | B1* | 9/2014 | Breau | H04M 15/41 705/34 |
| 9,009,258 | B2* | 4/2015 | Ramachandran | H04N 21/2396 709/217 |
| 9,043,453 | B1* | 5/2015 | Kielhofner | H04L 43/08 709/228 |
| 9,106,794 | B2* | 8/2015 | Jones | H04M 3/42221 |
| 9,146,906 | B1* | 9/2015 | Collins | G06F 16/9577 |
| 9,171,284 | B2* | 10/2015 | Gupta | H04L 65/4053 |
| 9,332,561 | B1* | 5/2016 | Khawam | H04W 72/542 |
| 9,532,089 | B2* | 12/2016 | Alexander | H04L 9/32 |
| 10,348,908 | B2* | 7/2019 | Lawson | H04L 67/10 |
| 11,283,934 | B1* | 3/2022 | Viera | H04L 65/403 |
| 11,410,129 | B2* | 8/2022 | Radzewsky | G06F 9/542 |
| 2002/0027901 | A1* | 3/2002 | Liu | H04M 3/382 370/352 |
| 2002/0075304 | A1* | 6/2002 | Thompson | H04L 9/40 715/751 |
| 2004/0013247 | A1* | 1/2004 | Kurokawa | H04M 1/57 455/403 |
| 2004/0015547 | A1* | 1/2004 | Griffin | H04L 67/306 709/204 |
| 2004/0248594 | A1* | 12/2004 | Wren, III | H04W 84/16 455/414.1 |
| 2004/0258219 | A1* | 12/2004 | Breitenbach | H04M 3/4938 379/88.22 |
| 2006/0117050 | A1* | 6/2006 | John | H04L 67/54 |
| 2006/0128359 | A1* | 6/2006 | Jung | H04M 1/56 455/406 |
| 2006/0203980 | A1* | 9/2006 | Starkie | G06F 8/65 379/88.18 |
| 2007/0055731 | A1* | 3/2007 | Thibeault | H04L 51/224 709/204 |
| 2007/0088851 | A1* | 4/2007 | Levkovitz | G06Q 30/0276 709/246 |
| 2007/0121859 | A1* | 5/2007 | Smelyansky | H04Q 3/0016 379/158 |
| 2007/0282792 | A1* | 12/2007 | Bailly | G06F 16/9537 |
| 2008/0049922 | A1* | 2/2008 | Karniely | H04L 12/1822 379/205.01 |
| 2008/0201446 | A1* | 8/2008 | Svendsen | H04L 43/00 709/224 |
| 2009/0003584 | A1* | 1/2009 | Walker | H04M 3/523 379/265.09 |
| 2009/0048845 | A1* | 2/2009 | Burckart | G10L 15/26 709/206 |
| 2009/0083426 | A1* | 3/2009 | Cagenius | H04L 61/2578 709/227 |
| 2009/0113460 | A1* | 4/2009 | Parrish | H04L 69/18 719/328 |
| 2009/0141884 | A1* | 6/2009 | Lyman | H04L 51/214 379/265.02 |
| 2009/0268009 | A1* | 10/2009 | Oya | H04L 12/1831 709/227 |
| 2009/0307612 | A1* | 12/2009 | Singh | G06Q 10/10 709/204 |
| 2009/0319916 | A1* | 12/2009 | Gudipaty | H04N 7/15 715/753 |
| 2010/0208625 | A1* | 8/2010 | Logan | H04L 51/222 379/202.01 |
| 2011/0047500 | A1* | 2/2011 | Abramson | G06F 9/451 715/781 |
| 2011/0090822 | A1* | 4/2011 | Lee | H04M 3/56 370/260 |
| 2011/0145343 | A1* | 6/2011 | Golobrodsky | H04L 65/1069 709/227 |
| 2011/0185286 | A1* | 7/2011 | Moyers | H04L 12/1827 715/752 |
| 2012/0072418 | A1* | 3/2012 | Svendsen | G06Q 30/0631 707/724 |
| 2012/0072507 | A1* | 3/2012 | Chen | H04L 51/56 709/206 |
| 2012/0315881 | A1* | 12/2012 | Woloshyn | G06Q 10/10 455/412.2 |
| 2013/0055108 | A1* | 2/2013 | Bhattiprolu | H04L 12/1822 715/753 |
| 2013/0204947 | A1* | 8/2013 | Guzman Suarez | G06F 16/90344 709/206 |
| 2013/0218885 | A1* | 8/2013 | Satyanarayanan | G06Q 30/016 707/728 |
| 2013/0226943 | A1* | 8/2013 | Zheng | H04L 51/04 707/755 |
| 2013/0262168 | A1* | 10/2013 | Makanawala | G06Q 30/016 705/7.14 |
| 2013/0263021 | A1* | 10/2013 | Dunn | H04N 21/8173 715/756 |
| 2014/0068463 | A1* | 3/2014 | Kay | H04L 12/1822 715/753 |
| 2014/0148136 | A1* | 5/2014 | Thange | H04M 1/72403 455/414.1 |
| 2014/0282089 | A1* | 9/2014 | West | H04M 3/565 715/753 |
| 2014/0351212 | A1* | 11/2014 | Lin | G06F 16/178 707/624 |
| 2014/0365476 | A1* | 12/2014 | Rajakarunanayake | G06F 16/9537 707/723 |
| 2015/0127741 | A1* | 5/2015 | Leacock | G06Q 10/10 709/204 |
| 2015/0178403 | A1* | 6/2015 | King | G06Q 30/02 707/754 |
| 2015/0235258 | A1* | 8/2015 | Shah | G06Q 30/0242 705/14.45 |
| 2015/0261389 | A1* | 9/2015 | Abate | H04L 65/1059 715/741 |
| 2015/0281445 | A1* | 10/2015 | Kumar | H04M 3/42221 379/88.01 |
| 2015/0295955 | A1* | 10/2015 | Cholkar | H04L 65/1093 709/204 |
| 2015/0324933 | A1* | 11/2015 | Allen | G06Q 30/0239 705/26.4 |
| 2016/0019578 | A1* | 1/2016 | Sriharsha | G06Q 30/0242 705/14.41 |
| 2016/0063226 | A1* | 3/2016 | Singh | H04L 69/14 726/19 |
| 2016/0134495 | A1* | 5/2016 | Banescu | G06F 11/3476 709/224 |
| 2016/0156691 | A1* | 6/2016 | Leeb | H04L 65/80 709/225 |
| 2016/0165150 | A1* | 6/2016 | Ayers | H04L 67/10 348/239 |
| 2016/0352712 | A1* | 12/2016 | Tamp | G06F 21/6245 |
| 2017/0006160 | A1* | 1/2017 | Marya | H04W 4/14 |
| 2017/0031659 | A1* | 2/2017 | Burke | G06F 16/242 |
| 2017/0048284 | A1* | 2/2017 | Inomata | G06F 3/1454 |
| 2017/0126717 | A1* | 5/2017 | Siva Kumar | H04L 63/1425 |
| 2017/0142259 | A1* | 5/2017 | Schmitz | H04L 65/1069 |
| 2017/0185252 | A1* | 6/2017 | Katai | H04L 67/14 |
| 2017/0185267 | A1* | 6/2017 | Katai | G06F 3/04842 |
| 2018/0063320 | A1* | 3/2018 | Singh | H04L 65/403 |
| 2018/0242382 | A1* | 8/2018 | Brooksby | G16H 40/67 |
| 2018/0249014 | A1* | 8/2018 | Karlsson | H04L 65/1069 |
| 2018/0255007 | A1* | 9/2018 | Ji | H04L 51/04 |
| 2018/0338026 | A1* | 11/2018 | Jon | H04M 1/576 |
| 2018/0352303 | A1* | 12/2018 | Siddique | H04L 65/1069 |
| 2020/0204466 | A1* | 6/2020 | Moore | H04N 1/00506 |
| 2021/0297395 | A1* | 9/2021 | Ruparel | H04L 9/0643 |

\* cited by examiner

Fuze

PEOPLE (CALLS) MEETINGS

🔍 Search for Calls

Filter by
All Calls
Missed Calls

Friday

📞 ↗ 5551231234     11:33 AM
From 5552311234

📞 ↗ 5523511234     11:23 AM
From 5523511234

○ Jim Jones     8:57 AM
↘ 5552311234    From 5552311234

○ Jane Doe     8:47 AM
↗ 5355121234    From 5355121234

Thursday

○ John Smith     9:13 AM
↗ 5355121234    From 5355121234

○ John Smith     9:08 AM
↗ 5355121234    From 5355121234

○ John Smith     9:03 AM
↗ 5355121234    From 5355121234

○ John Smith     4:11 AM
↗ 5355121234    From 5355121234

ⓧ ESC

PROVIDING A COMMUNICATION HISTORY OF A MULTI-MODAL COMMUNICATION BASED ON AN AGGREGATION OF EVENTS

CROSS-REFERENCE TO RELATED APPLICATION

The present application claims the benefit of priority under 35 U.S.C. § 120 as a continuation of U.S. patent application Ser. No. 16/383,456 filed on Apr. 12, 2019 (U.S. Pat. No. 11,283,934), which is a continuation of U.S. patent application Ser. No. 15/706,170 filed on Sep. 15, 2017 (U.S. Pat. No. 10,306,071), and entitled "PROVIDING A UNIFIED COMMUNICATION HISTORY OF A MULTI-MODAL COMMUNICATION"; each of the disclosures is hereby incorporated by reference in its entirety for all purposes.

TECHNICAL FIELD

The present disclosure generally relates to a communication application, and more specifically relates to providing a unified communication history of a multi-modal communication.

BACKGROUND

A multi-modal communication is a single communication between two parties that occurs through multiple modes such as chat, voice, video, meeting, or voice over Internet protocol (VOIP). Typical communication applications can provide some form of history for a single modal communication, such as a call or chat history. However, communication applications generally do not provide a unified communication history of a multi-modal communication.

SUMMARY

The present disclosure describes a system that provides a unified communication history of a multi-modal communication. The multi-modal communication includes a first communication modality and a second communication modality. The first and second communication modality can be chat, voice, video, meeting or voice over Internet protocol (VOIP). The system receives a plurality of event logs related to the multi-modal communication. Each event log includes one or more events of the multi-modal communication. Each event log also includes the users participating in the one or more events of the multi-modal communication and the devices associated with the users. A user participating in the multi-modal communication may switch devices during the communication. The system aggregates the events from the event logs and resolves the identity of each user participating in the aggregated events. The system stores the aggregated events into a unified communication history of the multi-modal communication, which can then be provided for display to one of the participating user's device.

According to one aspect of the present disclosure, a computer-implemented method is disclosed that provides a unified communication history of a multi-modal communication. The method includes receiving a plurality of event logs related to the multi-modal communication. Each event log comprises one or more events of the multi-modal communication, a plurality of users participating in the one or more events, and a plurality of devices associated with the plurality of users. The multi-modal communication comprises a first communication modality and a second communication modality. The method includes aggregating the one or more events from the event logs as a plurality of aggregated events. The method includes resolving an identity of each user from among the plurality of users in the plurality of aggregated events. The method includes storing the plurality of aggregated events into a communication history of the multi-modal communication.

According to one embodiment of the present disclosure, a system providing a unified communication history of a multi-modal communication is disclosed that includes one or more processors and a computer-readable storage medium coupled to one or more processors, the computer-readable storage medium including instructions. The instructions cause the one or more processors to receive a plurality of event logs related to the multi-modal communication. Each event log includes one or more events of the multi-modal communication, a plurality of users participating in the one or more events, and a plurality of devices associated with the plurality of users. The multi-modal communication includes a first communication modality and a second communication modality. The instructions also cause the one or more processors to aggregate the one or more events from the event logs as a plurality of aggregated events. The instructions also cause the one or more processors resolve an identity of each user from among the plurality of users in the plurality of aggregated events. The instructions also cause the one or more processors store the plurality of aggregated events into a communication history of the multi-modal communication.

According to one aspect of the present disclosure, a non-transitory machine-readable storage medium is disclosed including machine-readable instructions that, when executed by a processor, cause the processor to perform operations that include receiving a plurality of event logs related to a multi-modal communication. Each event log includes one or more events of the multi-modal communication, a plurality of users participating in the one or more events, and a plurality of devices associated with the plurality of users. The multi-modal communication includes a first communication modality and a second communication modality. The one or more events include content that is shared, or a list of activities performed during the multi-modal communication. The operations include aggregating the one or more events from the event logs as a plurality of aggregated events. The operations include resolving an identity of each user from among the plurality of users in the plurality of aggregated events. The operations include storing the plurality of aggregated events into a communication history of the multi-modal communication.

According to one aspect of the present disclosure, a system is disclosed for providing a unified communication history of a multi-modal communication. The system includes means for receiving a plurality of event logs related to the multi-modal communication. Each event log includes one or more events of the multi-modal communication, a plurality of users participating in the one or more events, and a plurality of devices associated with the plurality of users. The multi-modal communication includes a first communication modality and a second communication modality. The system includes means for aggregating the one or more events from the event logs as a plurality of aggregated events and resolving an identity of each user from among the plurality of users in the plurality of aggregated events. The plurality of aggregated events are stored into a communication history of the multi-modal communication.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5 illustrates an example screenshot of a user interface in which the communication history provided by the example process of FIG. 3 can be filtered to show a recent list of all calls.

FIG. 6 illustrates an example screenshot of a user interface in which the communication history provided by the example process of FIG. 3 can be visualized to show a communication history between users.

Figure 1:
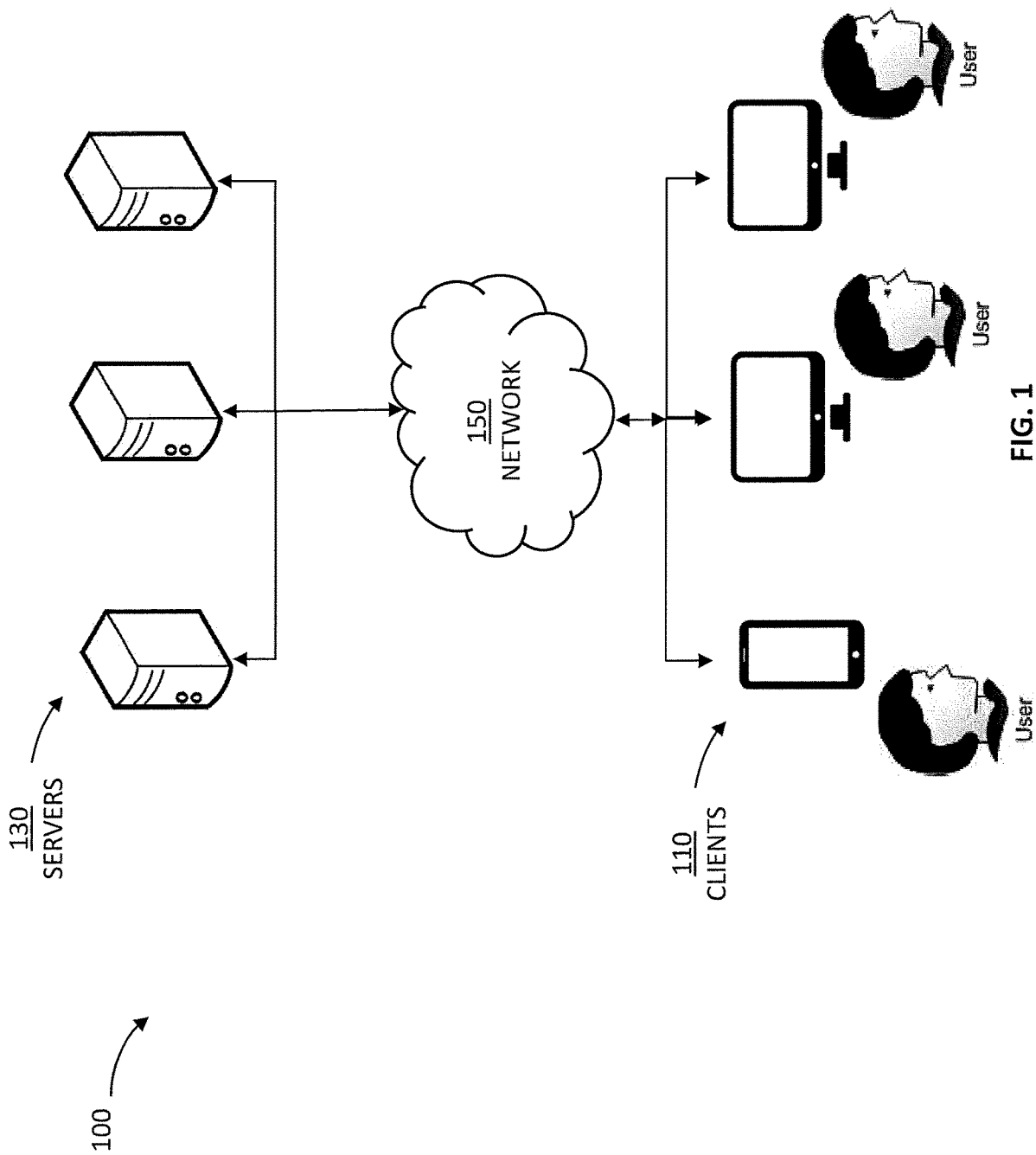
FIG. 1 illustrates an example architecture for providing a unified communication history of a multi-modal communication suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Existing communication applications are commonly able to generate some form of communication history such as a call or chat log. Existing communication applications are generally limited to a single modal communication such as chat or call as well as being generally limited to a single communication device type such as a hard phone or a desktop. Existing communication applications commonly do not support, or poorly support, generating a communication history for calls placed and received on hard phones. Existing communication applications also commonly do not include the activities performed during the single-modal communication in the call or chat log. Additionally, the chat or call logs generated by existing communication applications are generally limited to providing data about the call or chat at the 'user' level, but not at the communication device level.

The disclosed system addresses a problem with existing communication applications, namely the inability to provide a unified communication history for a multi-modal communication between users, which is a problem specifically arising in the realm of computer networks. Computer networks enable connectivity between an increasing number of communication devices. When connected with each other over a computer network, the communication devices enable their respective users to communicate with each other through the various communication modalities supported by their device. This gives rise to the technical problem of providing a unified history of a communication that includes multiple users, communication modalities and device types that may change over the course of the communication. The problem is addressed by providing a technical solution rooted in computer technology, namely, by providing a unified communication history across multiple communication modalities and multiple communication device types.

The disclosed system provides several advantages, including providing a unified communication history across multiple communication modalities, such as, chat, phone, voice over Internet protocol (VOIP), video, video calls and meetings, SMS and meetings. The disclosed system also provides a unified communication history across multiple types of communication device types such as a hard desk phone, a mobile phone, a desk top, fax machine, a smartphone, conference rooms, a software softphone, a browser-based softphone, etc. The disclosed system supports call transfer in which the transfer of the ongoing communication between devices is considered as part of the ongoing communication rather than a new communication. A user participating in the multi-modal communication can switch devices during the ongoing communication. The disclosed system also supports a change in communication modalities during an ongoing communication and considers this modality change as part of the ongoing communication rather than a new or different communication. For example, a modality change from voice to video during an ongoing communication is seen as part of one single communication instead of two different communications. Additionally, implementations of the disclosed system aggregate the communication history at the user level as well as the communication device level. Some implementations of the disclosed system and method may offer in real-time a unified communication history for a user based on his/her soft and desk phone call activity, instant messaging, video conferences, content shared and Application Programming Interface (API)-based integrated services notifications. The disclosed system and method also provides a unified communication history that includes content that is shared or a list of activities performed during the multi-modal communication. The disclosed system and method can also resolve information about the users participating in the multi-modal communication for example by using the phone numbers and extensions of the users to identify the corporations associated with the users.

The disclosed system and method provide several advantages including providing the unified communication history data of a multi-modal communication such that it can be visualized in a user interface to track and provide rich insights about advanced communication flows such as call queues and ring groups (e.g. the call is transferred from a first user to a second user) and highlight communication flow across multiple devices.

Although certain examples provided herein may describe a user's information being stored in memory, each user must grant explicit permission for such user information to be stored. The explicit permission may be granted using privacy controls integrated into the disclosed system. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for providing a unified communication history of a multi-modal communication suitable for practicing some implementations of the disclosure. The multi-modal communication includes a first communication modality and a second communication modality that is different from the first communication modality. The architecture 100 includes servers 130 and clients 110 connected over a network 150. One of the many servers 130 is configured to host a system that provides a unified communication history for a multi-modal communication transmitted between the clients 110 over the network 150. As such, the disclosed system can, for example, receive a plurality of event logs related to the multi-modal communication. Each event log includes one or more events of the multi-modal communication, a plurality of users participating in the one or more events, and a plurality of devices associated with the plurality of users. The disclosed system can aggregate the one or more events from the event logs as a plurality of aggregated events. A first device associated with a first user from among the plurality of users participating in a first event of the plurality of aggregated events is different from a second device associated with the first user participating in a second event of the plurality of aggregated events. The disclosed system can resolve an identity of each user from among the plurality of users in the plurality of aggregated events and store the plurality of aggregated events into a communication history of the multi-modal communication. For purposes of load balancing, multiple servers 130 can host the unified communication history system.

The servers 130 can be any device having an appropriate processor, memory, and communications capability for providing a unified communication history of a multi-modal communication. The clients 110 to which the servers 130 are connected over the network 150 can be, for example, any communication device such as desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, one or more of the servers 110 can be a cloud computing server of an infrastructure-as-a-service (IaaS) and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example Unified Communication History System

Figure 2:
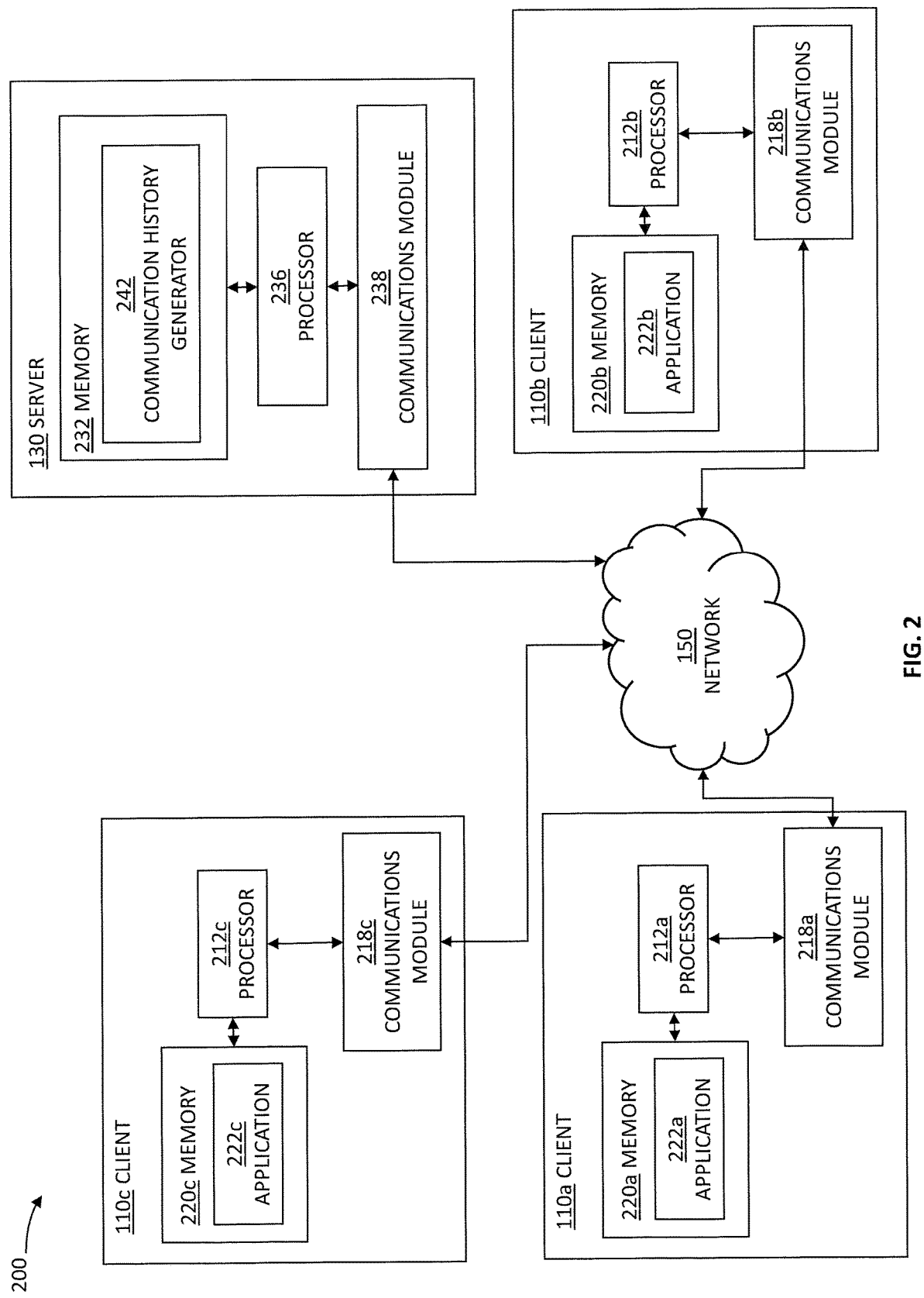
FIG. 2 is a block diagram illustrating the example servers and clients in the architecture of FIG. 1 according to certain aspects of the disclosure.

FIG. 2 is a block diagram 200 illustrating an example server 130, a first client 110a, a second client 110b and a third client 110c in the architecture 100 of FIG. 1 according to certain aspects of the disclosure. The first client 110a, the second client 110b, the third client 110c and the server 130 are connected over the network 150 via their respective communications modules 218a, 218b, 218c and 238. The communications modules 218a, 218b, 218c and 238 are configured to interface with the network 150 to send and receive information, such as data, requests, responses, and commands to other devices on the network 150. The communications modules 218a, 218b, 218b and 238 can be, for example, modems or Ethernet cards.

The server 130 includes a processor 236, a communications module 238 and a memory 232. The memory 232 of the server 130 includes a communication history generator 242. The processor 236 of the server 130 is configured to execute instructions, such as instructions physically coded into the processor 236, instructions received from software in memory 232, or a combination of both.

The first, second and third client 110a, 110b and 110c include the processors 212a, 212b and 212c, the communications modules 218a, 218b and 218c and the memories 220a, 220b and 220c that include the applications 222a, 222b and 222c. The first client 110a, the second client 110b and third client 110c also each include an input device, such as a keyboard or mouse, and an output device, such as a display. The processors 212 of the clients 110 are configured to execute instructions, such as instructions physically coded into the processors 212, instructions received from software (e.g. communication history generator 242) in memories 240, or a combination of both.

For example, instructions from the communication history generator 242 may be a module executed by the processor 236 to receive a plurality of event logs related to the multi-modal communication. The multi-modal communication includes a first communication modality and a second communication modality that is different from the first communication modality. Each event log comprises one or more events of the multi-modal communication, a plurality of users participating in the one or more events, and a plurality of devices (such as clients 110a, 110b and/or 110c)

associated with the plurality of users. The processor 236, in response to instructions from the communication history generator 242, aggregates the events from the received event logs as a plurality of aggregated events and resolves an identity of each user from among the plurality of users in the plurality of aggregated events. The processor 236, in response to instructions from the communication history generator 242, stores the plurality of aggregated events into a communication history of the multi-modal communication. Storing the aggregated events into the communication history of the multi-modal communication may include storing one or more aggregated events in each user's communication history and presenting each user's communication history to that user. Storing the aggregated events into the communication history of the multi-modal communication may include storing one or more aggregated events in a conversation history between the users participating in the events.

The first and second communication modality may be at least one of chat, voice, video, meeting or voice over Internet protocol (VOIP). The device may be at least one of a hard phone, soft phone, a mobile device, a fax machine, a smartphone or a desktop computer. The plurality of aggregated events may include at least one of initiating the multi-modal communication, establishing a connection for the multi-modal communication, or terminating the multi-modal communication. The one or more events may include content that is shared or a list of activities performed during the multi-modal communication. The first device's communication modality may be different from the second device's communication modality.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
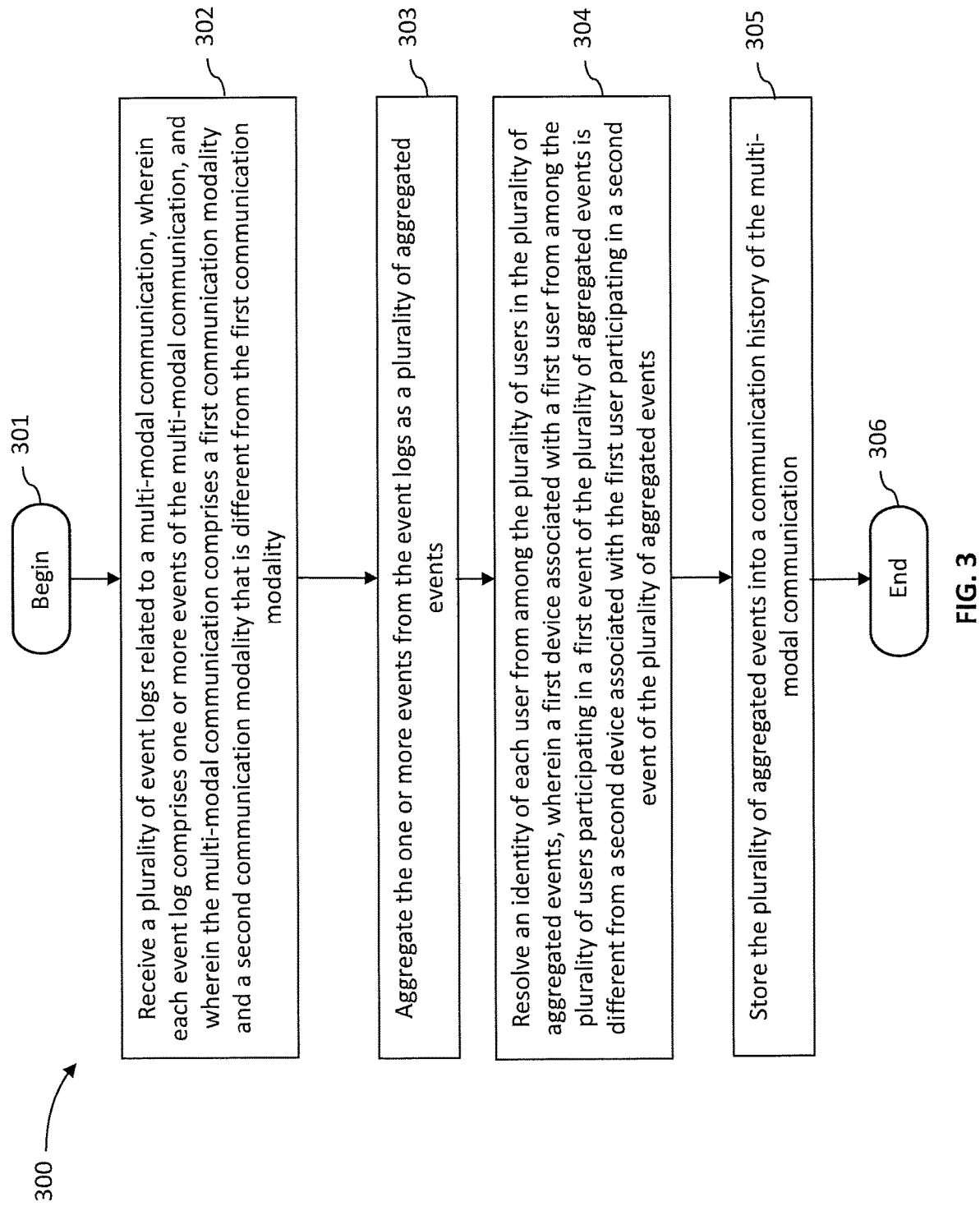
FIG. 3 sets forth an example process for providing a unified communication history of a multi-modal communication.

FIG. 3 illustrates an exemplary process 300 for providing a unified communication history of a multi-modal communication using the example system of FIG. 2. While FIG. 3 is described with reference to FIG. 2, it should be noted that the process steps of FIG. 3 may be performed by other systems. The process 300 begins by proceeding from step 301 to step 302 when a plurality of event logs related to a multi-modal communication are received, wherein each event log comprises one or more events of the multi-modal communication, a plurality of users participating in the one or more events, and a plurality of devices associated with the plurality of users, and wherein the multi-modal communication comprises a first communication modality and a second communication modality that is different from the first communication modality. In step 303, the one or more events from the event logs are aggregated as a plurality of aggregated events. In step 304, an identity of each user from among the plurality of users in the plurality of aggregated events is resolved, wherein a first device associated with a first user from among the plurality of users participating in a first event of the plurality of aggregated events is different from a second device associated with the first user participating in a second event of the plurality of aggregated events. In step 305, the plurality of aggregated events are stored into a communication history of the multi-modal communication and the process 300 ends at step 306.

FIG. 3 sets forth an exemplary process 300 for providing a unified communication history of a multi-modal communication using the example system of FIG. 2. An example will now be described using the exemplary process 300 of FIG. 3 using the example server 130 of FIG. 2, a smartphone as the exemplary client 110a, a first desktop running a first meeting application as the exemplary client 110b and a second desktop running a second meeting application as the exemplary client 110c. When connected, the user of the smartphone (e.g., first client 110a), the user of the first desktop 110b and the user of the second desktop 110c participate in a multi-modal communication. The multi-modal communication includes a first communication modality such as voice communication transmitted between the smartphone 110a and the desktops (e.g., second client 110b and third client 110c) via their respective meeting applications and a second communication modality such communication related to the meeting applications running on the first desktop (e.g., second client 110b) and the second desktop (e.g., third client 110c).

The process 300 begins by proceeding from step 301 to step 302 when the user of the smartphone 110a dials a phone number to connect into an ongoing communication between the user of the first desktop 110b and the user of the second desktop 110c. An event log is transmitted to the server 130. The event log includes one or more events corresponding to the user of the smartphone 110a dialing the phone number to connect into an ongoing communication between the user of the first desktop 110b and the user of the second desktop 110c. In step 303, the server 130 receives the event log. After connecting into the ongoing communication between the between the user of the first desktop 110b and the user of the second desktop 110c, the user of the smartphone 110a becomes a participant in the ongoing communication. During the communication, the server 130 continues to receive a plurality of event logs related to a multi-modal communication. The process 300 proceeds to step 304. In step 304, the server 130, using the communication history generator 242, aggregates the one or more events from the received event logs as a plurality of aggregated events. In step 315, the server 130, using the communication history generator 242, resolves an identity of each user from among the plurality of users in the plurality of aggregated events. A first device associated with a first user from among the plurality of users participating in a first event of the plurality of aggregated events is different from a second device associated with the first user participating in a second event of the plurality of aggregated events. As an example, the user of the first desktop 110b may switch from the first desktop 110b to a third desktop that is different from the first desktop 110a. The process 300 proceeds to step 305 and the server 130, using the communication history generator 242, stores the plurality of aggregated events into a communication history of the multi-modal communication and the process 300 ends at step 306.

In some implementations, the plurality of event logs are received from a plurality of communication servers. Storing the plurality of aggregated events into the communication history of the multi-modal communication may include storing one or more aggregated events in each user's communication history. A user's communication history may be presented to that user. Storing the plurality of aggregated events into the communication history of the multi-modal communication may include storing one or more aggregated events in a conversation history between the users participating in the events. The communication modality is at least one of chat, voice, video, meeting or voice over Internet protocol (VOIP). The device associated with a user is at least one of a hard phone, soft phone, a mobile device, a fax machine, a smartphone or a desktop computer. The aggregated events may include at least one of initiating the multi-modal communication, establishing a connection for the multi-modal communication, or terminating the multi-modal communication.

Figure 4:
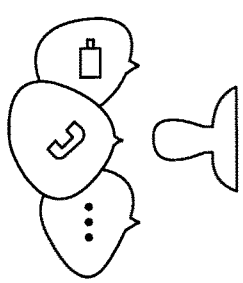
FIG. 4 illustrates an example screenshot of a user interface in which the communication history provided by the example process of FIG. 3 can be visualized to show a list of all users participating in all communications.
Figure 6:
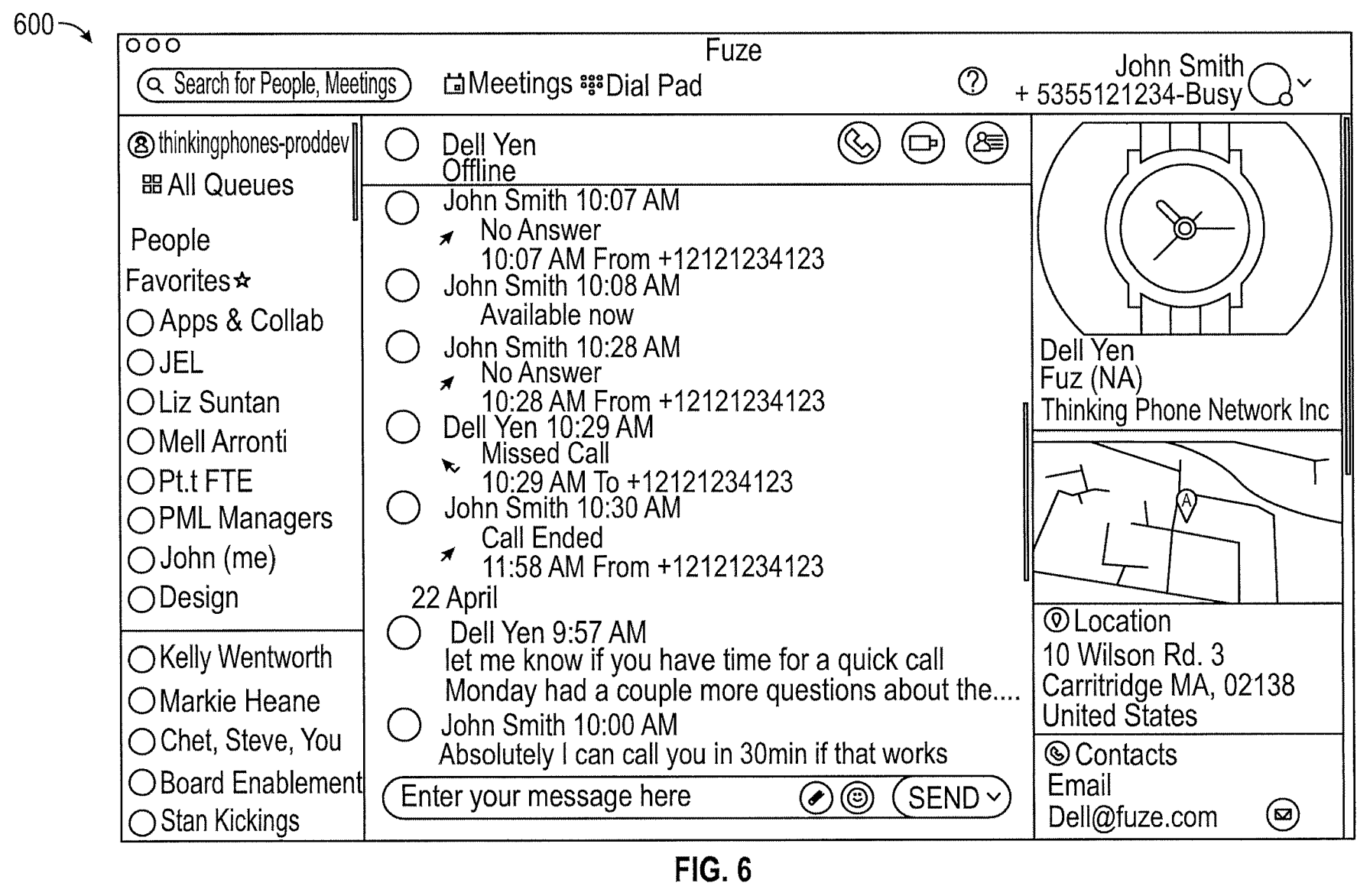

In some implementations, the unified communication history data of multi-modal communications can be visualized to track and provide rich insights about advanced communication flows such as call queues and ring groups (e.g. the call is transferred from a first user to a second user) and highlight communication flow across multiple devices. FIG. 4 illustrates an example screenshot 400 of a user interface in which the communication history provided by the example process 300 of FIG. 3 can be visualized to show a list of all users participating in all communications. FIG. 5 illustrates an example screenshot 500 of a user interface in which the communication history provided by the example process 300 of FIG. 3 can be filtered to show a recent list of all calls. FIG. 6 illustrates an example screenshot 600 of a user interface in which the communication history provided by the example process 300 of FIG. 3 can be visualized to show a communication history between users. The visualization can show both a communication history between individuals, between individuals and group and between groups.

Hardware Overview

Figure 7:
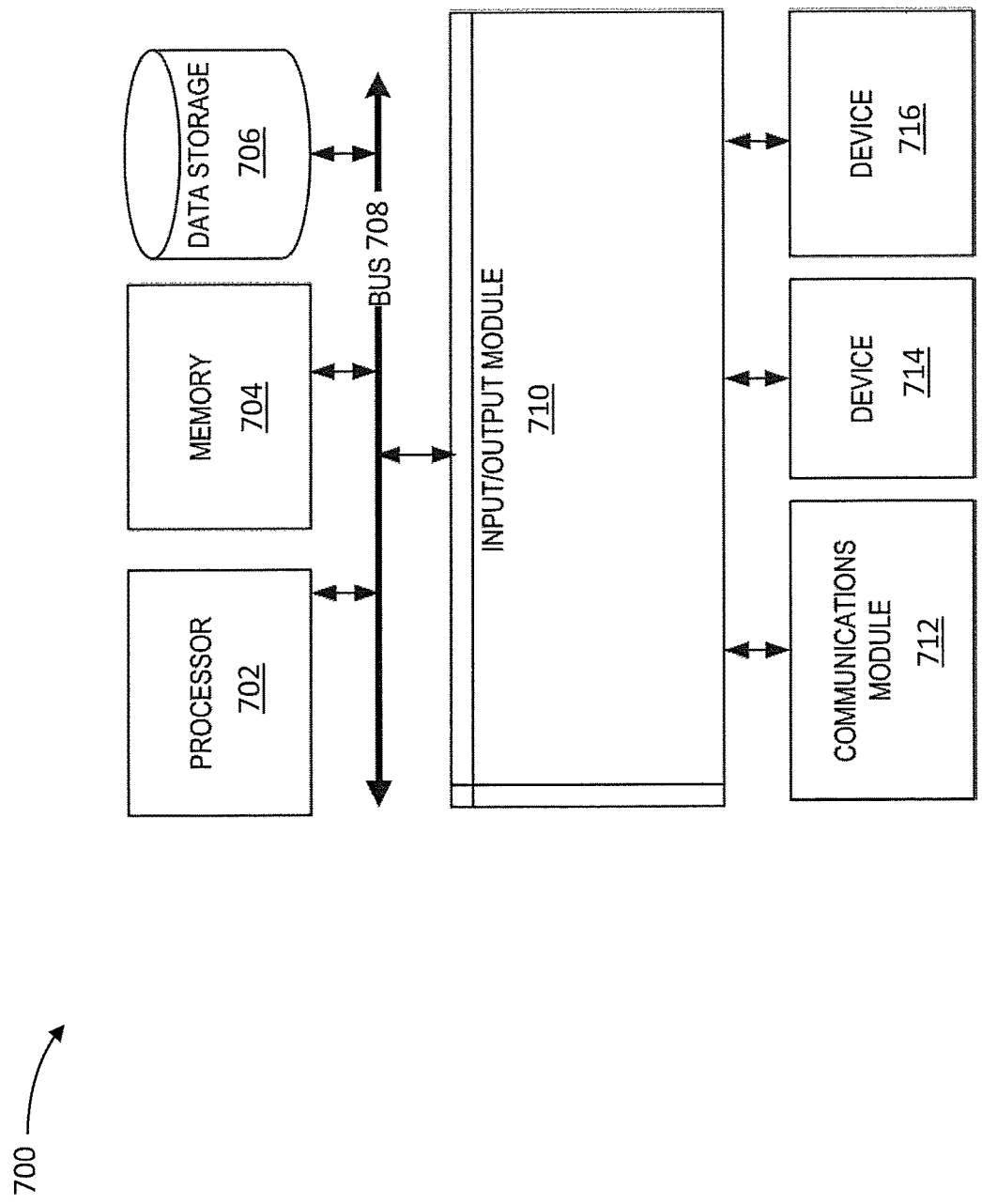
FIG. 7 is a block diagram illustrating an example computer system with which the example clients and server of FIG. 2 can be implemented.

FIG. 7 is a block diagram illustrating an example computer system 700 with which clients 110 and server 130 of FIG. 2 can be implemented. In certain aspects, the computer system 700 may be implemented using hardware or a combination of software and hardware, either in a dedicated server, or integrated into another entity, or distributed across multiple entities.

Computer system 700 (e.g., clients 110a, 110b and server 130) includes a bus 508 or other communication mechanism for communicating information, and a processor 702 (e.g., processor 212 and 236) coupled with bus 708 for processing information. According to one aspect, the computer system 700 can be a cloud computing server of an IaaS that is able to support PaaS and SaaS services. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 232a and 232b), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, e.g., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., 238*a* and 238*b*) include networking interface cards, such as Ethernet cards and modems.

The components of the system can be interconnected by any form or medium of digital data communication, e.g., a communication network. The communication network (e.g., communication network 150) can include, for example, any one or more of a PAN, a (LAN), a CAN, a MAN, a (WAN, a BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the clients 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. Processor 702 may process the executable instructions and/or data structures by remotely accessing the computer program product, for example by downloading the executable instructions and/or data structures from a remote server through communications module 712 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 700 can include clients and servers. A client and server are generally remote from each other and typically interact through a communication network. The relationship of client and server arises by virtue of computer programs running on the respective computers and having a client-server relationship to each other. Computer system [#6]00 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology.

Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   for each of a plurality of event logs associated with a multi-modal communication involving a current communication and involving an establishment of communication connections respectively using different communication modalities and a termination of at least one of the communication connections of the multi-modal communication, processing data indicating a plurality of users participating in one or more events and indicating a plurality of user-communication devices including respective data-communication circuits and being respectively accessible to the plurality of users;
   aggregating data concerning the one or more events from the event logs as a plurality of aggregated events and resolving an identity of each user from among the plurality of users in the plurality of aggregated events;
   storing the plurality of aggregated events into a communication history of the current communication of the multi-modal communication, wherein the plurality of aggregated events includes at least one of data corresponding to the establishment of communication connections and data corresponding to the termination of the at least one of the communication connections of the multi-modal communication; and
   presenting a user's communication history, based at least in part on the communication history of the current communication of the multi-modal communication and a change during the current communication between two of the different communication modalities, for display.

2. The computer-implemented method of claim 1, wherein storing the plurality of aggregated events into the communication history of the current communication of the multi-modal communication comprises storing one or more aggregated events in a conversation history between the plurality of users participating in the one or more events.

3. The computer-implemented method of claim 1, wherein the plurality of user-communication devices includes a first user-communication device conveying data via a first modality with a first user from among the plurality of users and includes a second user-communication device conveying data via a second different modality with a second user from among the plurality of users, and wherein during the current communication the first user switches from the first user-communication device to another user-communication device for conveying data also as part of the current communication.

4. The computer-implemented method of claim 1, wherein the different communication modalities include at least two from among: chat, voice, video, meeting or voice over Internet protocol (VOIP).

5. The computer-implemented method of claim 1, wherein each of the plurality of user-communication devices associated with the plurality of users is at least one of a hard phone, soft phone, a facsimile machine, a smartphone and a desktop computer.

6. The computer-implemented method of claim 1, wherein the plurality of event logs are received from a plurality of communication servers.

7. The computer-implemented method of claim 1, wherein one or more of the plurality of aggregated events comprise content that is shared, or a list of activities performed during the multi-modal communication.

8. The computer-implemented method of claim 1, wherein the plurality of user-communication devices includes a first type of user-communication device conveying data via a first modality with a first user from among the plurality of users and includes a second different type of user-communication device conveying data via a second different modality with a second user from among the plurality of users, and wherein during the current communication the first user switches from using the first type of user-communication device to another different type of user-communication device for conveying data also as part of the current communication.

9. The computer-implemented method of claim 1, wherein during the current communication a first one of the plurality of users switches from using a first user-communication device to a second different user-communication device for conveying data and the one or more events aggregated for the current communication is based on or includes data conveyed via the first user-communication device and via the second different user-communication device.

10. The computer-implemented method of claim 1, wherein during the current communication, one or more servers are to store and provide access to a unified communication history for the multi-modal communication involving the plurality of users.

11. The computer-implemented method of claim 1, wherein during the current communication, one or more servers are to process data conveyed in the current communication and carry out said aggregating.

12. The computer-implemented method of claim 1, wherein during the current communication, one or more servers are to provide a unified communication history for the multi-modal communication with data stored to permit tracking of insights concerning communication flows including ring groups.

13. The computer-implemented method of claim 1, wherein during the current communication, one or more servers are to provide a unified communication history for the multi-modal communication with data stored to permit tracking of insights concerning communication flows including call queues.

14. The computer-implemented method of claim 1, wherein during the current communication, one or more servers are to provide a unified communication history for the multi-modal communication with data stored to permit tracking of communication flow across multiple devices.

15. A data communications system for use with a plurality of user-communication devices, the data communications system comprising:
   a storage circuit; and
   computer processing circuitry, including one or more computer processors, to process data for each of a plurality of event logs associated with a multi-modal communication involving a current communication that is characterized as sharing certain content and involving an establishment of communication connections respectively using different communication modalities and a termination of at least one of the communication connections of the multi-modal communication, by:
      processing data indicating a plurality of users participating in one or more events and indicating the plurality of user-communication devices including respective data-communication circuits and being respectively accessible to the plurality of users;
      aggregating data concerning the one or more events from the event logs as a plurality of aggregated events and resolving an identity of each user from among the plurality of users in the plurality of aggregated events;
      in the storage circuit, storing the plurality of aggregated events into a communication history of the current communication of the multi-modal communication, wherein the plurality of aggregated events includes at least one of data corresponding to the establishment of communication connections and data corresponding to the termination of the at least one of the communication connections of the multi-modal communication; and
      presenting or outputting a user's communication history, based at least in part on at least one of the communication history of the current communication of the multi-modal communication and a change during the current communication between two of the different communication modalities.

16. The data communications system of claim 15, wherein the computer processing circuitry is to store the plurality of aggregated events into the communication history of the current communication of the multi-modal communication by storing one or more aggregated events in a conversation history between the plurality of users participating in the one or more events.

17. The data communications system of claim 15, wherein during the current communication the computer processing circuitry is to track data conveyed via a first modality by a first user-communication device from among the plurality of user-communication devices and track further data conveyed via a second modality by a second user-communication device from among the plurality of user-communication devices.

18. The data communications system of claim 17, wherein during the current communication, the computer processing circuitry is to track data conveyed by a first user from among the plurality of users before and after the first user switches from the first user-communication device to another user-communication device for conveying data also as part of the current communication.

19. The computer-implemented method of claim 1, wherein the different communication modalities include at least two from among: chat, voice, video, meeting or voice over Internet protocol (VOIP), and wherein each of the plurality of user-communication devices associated with the plurality of users is at least one of a hard phone, soft phone, a facsimile machine, a smartphone and a desktop computer.

20. In a communication system having at least one server configured to convey data communications, a method comprising:
   for each of a plurality of event logs associated with a multi-modal communication conveyed via the at least one server and involving an establishment of communication connections respectively using different communication modalities and a termination of at least one of the communication connections of the multi-modal communication, processing data indicating a plurality of users participating in or associated with certain events and indicating a plurality of user-communication devices including respective data-communication circuits and being respectively accessible to the plurality of users;
   aggregating data concerning the certain events from the event logs as a plurality of aggregated events and resolving an identity of each user from among the plurality of users in the plurality of aggregated events; and storing, or presenting for display, the plurality of aggregated events as a communication history of the multi-modal communication, wherein the plurality of aggregated events includes at least one of data corresponding to the establishment of communication connections and data corresponding to the termination of the at least one of the communication connections of the multi-modal communication.

\* \* \* \* \*